United States Patent [19]

Von Holtz et al.

[11] Patent Number: 5,563,674

[45] Date of Patent: Oct. 8, 1996

[54] CAMERA HAVING IMPROVED GRIP SURFACE AND METHOD OF MAKING SAME

[75] Inventors: Michael J. Von Holtz, Livonia; Carl E. Radzio, Jr., Brockport, both of N.Y.

[73] Assignee: Eastman Kodak Company, Rochester, N.Y.

[21] Appl. No.: 562,344

[22] Filed: Nov. 22, 1995

[51] Int. Cl.⁶ .................................................. G03B 17/02
[52] U.S. Cl. .................................. 396/540; 396/535
[58] Field of Search ....................... 354/288, 354

[56] References Cited

U.S. PATENT DOCUMENTS

| | | | |
|---|---|---|---|
| 4,183,650 | 1/1980 | Jacobson | 354/288 |
| 4,410,595 | 10/1983 | Matsumoto et al. | 428/412 |
| 4,427,600 | 1/1981 | Adachi | 354/288 |
| 4,918,477 | 4/1990 | Matsuda et al. | 354/288 |
| 4,997,707 | 3/1991 | Otawa et al. | 428/319.3 |
| 5,325,139 | 6/1994 | Matsumoto | 354/288 |

*Primary Examiner*—Michael L. Gellner
*Assistant Examiner*—Eddie C. Lee
*Attorney, Agent, or Firm*—Arthur E. Kluegel

[57] ABSTRACT

The invention provides a camera body having an external surface for a photographers hand to grip the camera, the surface comprising a laminate of (1) an external first layer comprising a thermoplastic elastomer bonded to (2) a second layer comprising a thermoplastic polymer which is, in turn, bonded to (3) a third layer comprising a thermoplastic polymer.

The invention also provides a method of making a camera having an external surface suitable for a photographers hand to grip the camera, the method comprising forming the camera body or a camera part that is later attached to the camera body by using a preformed laminate.

14 Claims, 2 Drawing Sheets

CAMERA HAVING IMPROVED GRIP SURFACE AND METHOD OF MAKING SAME

FIELD OF THE INVENTION

This invention relates to the art of cameras and methods of making cameras and in particular to cameras with an improved surface for gripping.

BACKGROUND OF THE INVENTION

The art of camera design and manufacture has progressed a long way since George Eastman first developed photographic film. The size and weight of cameras have both diminished greatly, thanks to the advent of new materials of construction. In particular, plastics have been adapted to provide many of the internal and external parts of modern cameras. The use of plastics have enabled manufacturers to employ much lighter components, and the improved technology in plastics has enabled the strength of plastics to be improved to the point where they can readily replace parts formerly required to be of metal.

As advances have been made in the use of plastics, and also in the photographic sciences, it has become possible to provide ever smaller cameras so that now it is common to carry a camera in one's shirt pocket or purse. One of the difficulties that has arisen is that plastic surfaces, especially molded plastic surfaces, tend to be quite smooth and difficult to grip. Given the small size of cameras, and possible difficult conditions such as cold temperatures, it is important that the camera be readily grippable by the photographer. One area where plastics remain generally inferior to metal is in impact resistance. Chances are a dropped plastic camera will never be repaired or repairable.

Thus there is a need for a plastic camera which provides a suitable gripping surface so that the camera is not easily dropped. Various methods have been employed to solve this problem including designing the macro shape of the surface to fit the hand or providing striations or ridges or painting the surface. These methods have not been altogether satisfactory.

Designing the shape of the surface is made particularly difficult where the object of the design is miniaturization. There is not much design volume to work with. Striations or ridges complicate the manufacturing process, are often readily worn off, and often suffer from the problem of being effective in only one direction. Painting of a plastic surface presents not only the problems associated with environmental and health concerns, but also typically provides a relatively thin surface that shows wear much before the rest of the camera.

It is therefore a problem to be solved to provide a camera which has an improved slip resistant surface to improve the photographers grip on the camera during handling and to provide a method of manufacturing same such a camera.

SUMMARY OF THE INVENTION

The invention provides a camera body having an external surface for a photographers hand to grip the camera, the surface comprising a laminate of (1) an external first layer comprising a thermoplastic elastomer bonded to (2) a second layer comprising a thermoplastic polymer which is, in turn, bonded to (3) a third layer comprising a thermoplastic polymer.

The invention also provides a method of making a camera having an external surface suitable for a photographers hand to grip the camera, the method comprising forming the camera body or a camera part that is later attached to the camera body by:

(1) forming a laminate of an elastomeric polymer and a first thermoplastic polymer;

(2) positioning the thus formed laminate in a mold having a cavity configuration corresponding to the desired shape of the part with the elastomeric polymer side facing the part of the mold corresponding to the external camera surface; and (3) injecting into the mold molten thermoplastic material in a manner so as to permit the injected material to bond to the surface of the first thermoplastic polymer, thereby forming an additional laminated layer with the elastomeric polymer layer as the external surface.

The camera and method of the invention serve to provide a much improved hand grip surface on the camera.

DETAILED DESCRIPTION OF THE INVENTION

The camera body of the invention is generally described in the Summary of the Invention. The body is typically of molded plastic construction. It is satisfactory if the portion of the camera body which is ultimately to be used as a hand grip is prepared as a laminate in accordance with the invention and then attached or bonded to the remainder of the camera body. On the other hand, it is possible to employ the laminate of the invention for a larger portion of the camera body e.g. the front or back body half.

Figure 1:
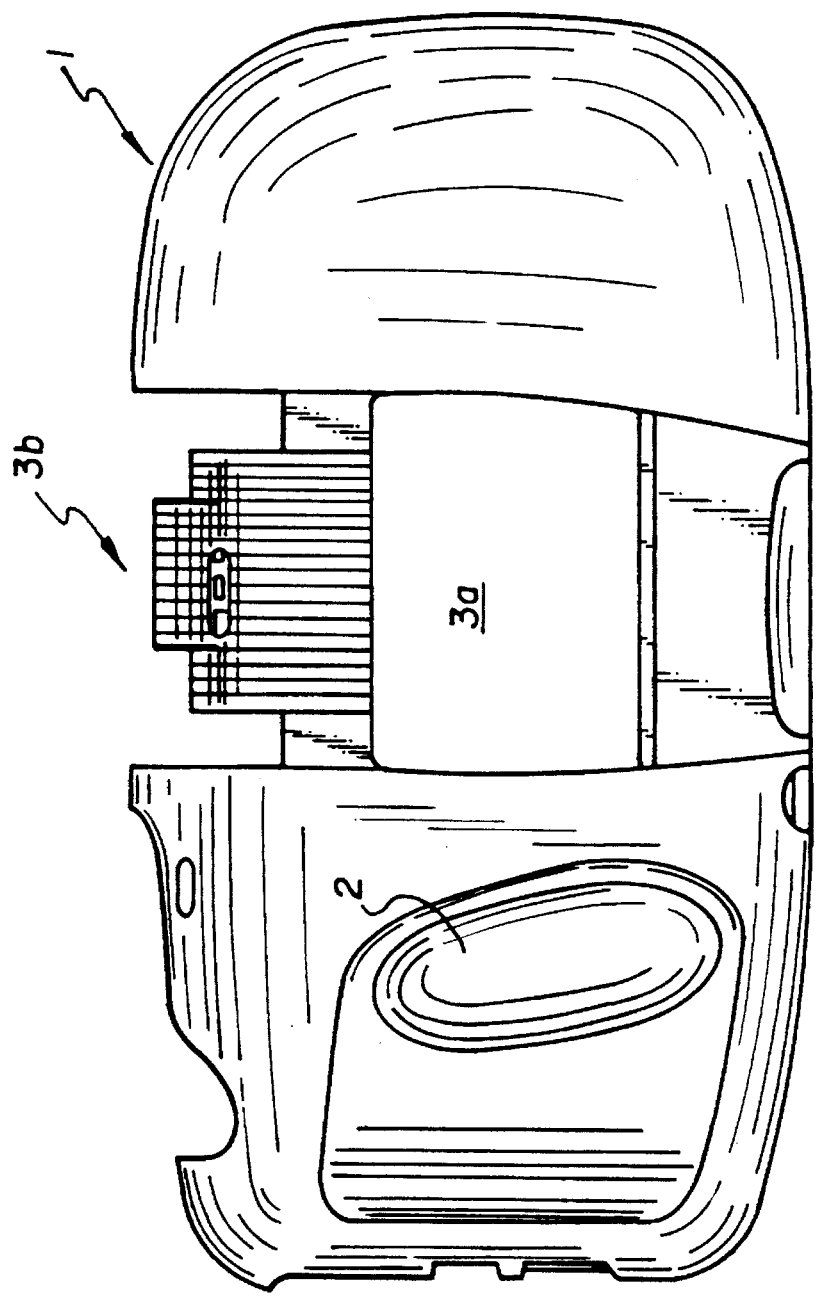
FIG. 1 is a plan view of a camera body with installed hand grip.

Turning to the drawings, FIG. 1 shows an embodiment of a camera body of the invention. The molded body 1 contains a snap-in-place grip portion 2. The grip portion is located and shaped so as to permit the photographer to grip the camera during picture taking or other handling without contacting the lens or flash area 3 of the body.

Figure 2:
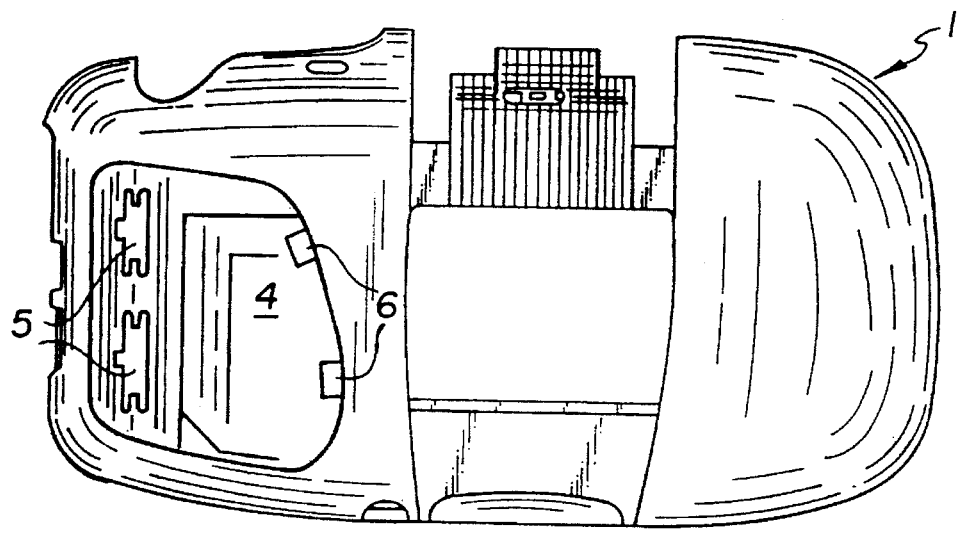
FIG. 2 is a plan view of the camera body of FIG. 1 without the hand grip installed.

FIG. 2 shows the camera body 1 with the snap-in-place grip 2 removed. With the removal of the snap-in-place, hole 4 becomes visible as well as the female and male snap together features 5 and 6 respectively.

Figure 3:
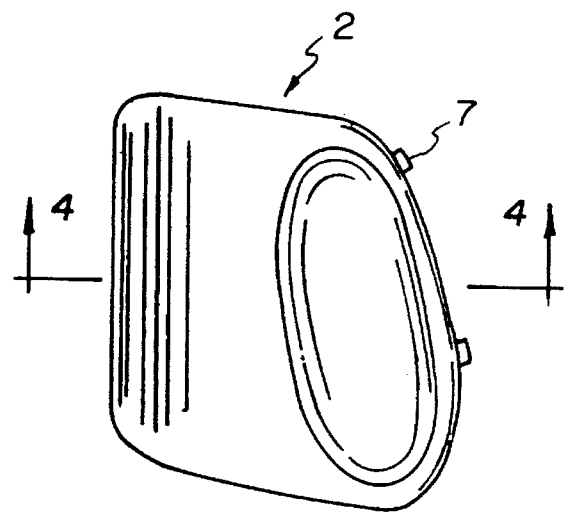
FIG. 3 is a plan view of the hand grip prior to installation in the camera body.

FIG. 3 shows the snap-in-place part 2 by itself. Tabs 7 are adapted for registration with the male snap together features 6. Tabs for mating with female features 5 are hidden form view but are conventional in nature and are adapted to fit snugly in features 5.

Figure 4:
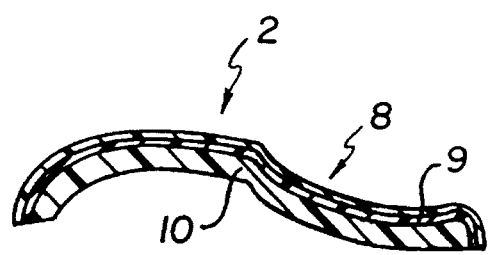
FIG. 4 is a cross section along A—A of FIG. 3 which shows the layers of the laminate.

FIG. 4 shows a cross section along line A—A in FIG. 3. The laminated nature of the grip part is shown. The external first layer 8 is composed of a thermoplastic elastomer. Second laminate layer 9 is composed of a thermoplastic polymer as is the third laminate layer 10. The polymers used for the second and third layers need not be the same but they must be compatible in order to effect a melt bond.

The method of the invention employs injection molding or thermoforming over a preformed laminate to form the full laminate of the invention. Initially, a laminate of an elastomeric polymer and a first thermoplastic polymer is formed by casting one layer onto the other or by coextruding the layers in a continuous manner. This or similar methodology enables obtaining a smoother surface layer which in turn improves the grip. This laminate is then placed in a mold having a cavity configuration corresponding to the desired part shape and is positioned with the elastomeric polymer side facing the part of the mold corresponding to the external camera surface. This positioning is followed by injecting into the mold molten thermoplastic material in a manner so as to permit the injected material to bond to the surface of the first thermoplastic polymer, thereby forming an additional laminated layer with the elastomeric polymer layer as the external surface. It is usually desirable for the temperature of the injected resin to be sufficient to effect at least a partial melting to the internal thermoplastic layer of the inserted laminate.

The external first layer of the laminate is comprised of a thermoplastic elastomer. Suitable elastomers are described, for example, in Billmeyer, F. *Textbook of Polymer Science*, Interscience Publishers, New York, N.Y. (1965) and in *Kirk-Othmer Science of Chemical Technology* 4th Ed, John Wiley & Sons, New York, N.Y. (1993). A particularly suitable elastomer is a polyurethane polymer. Examples of such polymers are based on 4,4' diisocyanato diphenyl methane and hexamethylene diisocyante monomers. A thickness for this layer of less than 0.005 cm is preferred with a thickness of about 0.0025 cm being typical.

The second layer is comprised of a thermoplastic polymer. This material may be chosen from a wide variety of alternatives as listed in the references above. Particularly suitable are acrylonitrile-butadiene-styrene (ABS) polymers, polystyrene polymers, and polycarbonate polymers. Considerations in selecting a specific material include the desire to match the melting point, formability, and expansion properties with those of the other laminate components. ABS materials are usually suitable for this layer.

The third layer is selected in a manner similar to the second layer with the same considerations in mind. It may be of the same composition as the second layer but may be different if desired. For example, the third layer may comprise a material noted more for its strength than for its formability or flexibility. As for the second layer, any thermoplastic polymer may be employed but ABS, polystyrene, and polycarbonate are particularly suitable.

The camera shown in the drawings is a still camera with the invention applied to a separate part attached to the camera body as a grip area. The entire camera body or any portion thereof may be laminated as provided in the invention. Further, the concept may be readily adapted to special purpose cameras (underwater, single use, panoramic etc.) and to video cameras adapted for moving pictures. Any of these cameras may be designed for use of silver halide film or for digital image capture.

Other advantages flow from the invention. Environmental concerns related to painting are eliminated. A soft feel surface can be employed. If transparent polymer layers are used then decoration or print can be employed in inner layers. The resistance to wear and environmental influences is improved.

Examples

The following examples serve to demonstrate different embodiments of the invention but are not intended to limit the scope of the invention.

In order to characterize and quantify grip strength of surfaces, an inclined plane test was used to determine the static coefficient of friction ($\mu_s$) of various samples. The samples included Sherwin Williams urethane paint that is currently being used for camera bodies (#4) and laminates supplied by Avery Dennison and Miles (#5–11). The films tested were either molded samples (polymer injection molded behind the film) and unmolded (as received from the film vendor) samples, as indicated. With this test, the samples with superior grip have a high $\mu_s$ value. The advantage to using the inventive films is that they offer significantly higher dry $\mu_s$ values (0.499–0.567 vs. 0.35) than the urethane paint or comparatives 2–4.

The static coefficient of friction tests were run on a TMI (Testing Machines Inc.) model 98-25 coefficient of friction tester. Ten tests were run on each sample and the results were recorded as degree of inclination. Static coefficient of friction values were calculated for each sample's average degree of inclination and are reported in Table I.

The tester is a hinged plane which is elevated by an electric motor. The plane stops inclining when a weight begins to slide down the sample on the inclined plane. The test method is as follows: the sample material is fastened to the plane and the plane is inclined at 1.5°±0.5°/sec. until the weight begins to slide on the sample. At this point an electric photocell stops the plane and the degree of inclination is read on the scale. The coefficient of friction is the tangent of the angle of inclination. These values are comparable with ASTM Standard Test Method D 1894-93.

TABLE I

Coefficient of Friction of Camera Grip Surfaces

| Sample | Type | Material | Coeff of Friction $-\mu_s$ | % vs. Sample 1 |
|---|---|---|---|---|
| 1 | C | Polycarbonate (PC)/ Polyurethane (PU) laminate* | 0.179 | — |
| 2 | C | Nonlaminated Acrylonitrile-Butadiene-Styrene (ABS)** - Sample #1 (Low texture) | 0.194 | +8.4% |
| 3 | C | Nonalminated Acrylonitrile-Butadiene-Styrene (ABS)** - Sample #2 (Hi texture) | 0.236 | +31.8% |
| 4 | C | PU paint on ABS** | 0.350 | +95.5% |
| 5 | I | PU/ABS laminate* PU/PC/ABS laminate** | 0.499 | +178.8 |
| 6 | I | #1 (Hi texture) | 0.408 | +127.9 |
| 7 | I | #2 (Low texture) | 0.514 | +187.2 |
| 8 | I | #3 (PC layer .02") | 0.540 | +201.7 |
| 9 | I | #4 (Pc layer .03") | 0.549 | +206.7 |
| 10 | I | #5 (PC layer .015") | 0.550 | +207.3 |
| 11 | I | #6 (PC layer .01") | 0.567 | +216.8 |

*Supplied by Avery Dennison Corp. as "Avloy"
**Supplied by Miles Inc. as "Makrofol"

The results of the table show that a much higher coefficient of friction and therefore a much stronger grip on the surface is obtained if the laminate of the invention is employed rather than comparison surfaces, laminates or a multilayer surface of the same materials obtained by painting the surface of the lower layer. The sample containing the painted PU resin did not exhibit the desired level of grip due to the fact that the spray application resulted in a rough surface which exhibited less coefficient of friction and less grip. Moreover, the paint was a thermoset rather than a thermoplastic polymer as in the invention.

What is claimed is:

1. A method of making a camera having an external surface suitable for a photographers hand to grip the camera, the method comprising forming the camera body or a camera part of the desired shape that is later attached to the camera body by:

(1) forming a laminate of an elastomeric polymer and a first thermoplastic polymer;

(2) positioning the thus formed laminate in a mold having a cavity configuration corresponding to the desired shape of the part with the elastomeric polymer side facing the part of the mold corresponding to the external camera surface; and (3) injecting into the mold molten thermoplastic material in a manner so as to permit the injected material to bond to the surface of the first thermoplastic polymer, thereby forming an additional laminated layer with the elastomeric polymer layer as the external surface.

2. The method of claim 1 wherein the method is used to form a camera part which is subsequently attached to the camera body.

3. The method of claim 2 wherein the camera part is joined to the rest of the camera by snaps.

4. The method of claim 2 wherein the camera part is joined to the rest of the camera by an adhesive.

5. The method of claim 1 wherein the method comprises forming a camera body half.

6. The method of claim 1 wherein the elastomeric polymer comprises a polyurethane polymer.

7. The method of claim 1 wherein the first and second thermoplastic polymers comprise polymers which are independently selected from the group consisting of ABS, polystyrene, and polycarbonate.

8. A camera body having an external surface for a photographers hand to grip the camera, said surface comprising a laminate of (1) an external first layer comprising a thermoplastic elastomer bonded to (2) a second layer comprising a thermoplastic polymer which is, in turn, bonded to (3) a third layer comprising a thermoplastic polymer.

9. The camera body of claim 8 wherein the third layer comprises a polymer selected from the group consisting of ABS, polystyrene, and polycarbonate.

10. The body of claim 9 wherein the third layer comprises polycarbonate.

11. The body of claim 8 wherein the second layer comprises the same thermoplastic polymer as the third layer.

12. The body of claim 8 wherein the second layer comprises a polymer selected from the group consisting of ABS, polystyrene, and polycarbonate.

13. The body of claim 8 wherein the first layer comprises a polyurethane elastomer.

14. The body of claim 8 wherein the second layer comprises an polycarbonate or ABS polymer and the first layer comprises a polyurethane polymer.

* * * * *